United States Patent
Yee

(10) Patent No.: US 9,989,998 B1
(45) Date of Patent: Jun. 5, 2018

(54) ADJUSTABLE FACIAL-INTERFACE SYSTEMS FOR HEAD-MOUNTED DISPLAYS

(71) Applicant: Oculus VR, LLC, Menlo Park, CA (US)

(72) Inventor: Phillip Yee, San Francisco, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days. days.

(21) Appl. No.: 15/652,565

(22) Filed: Jul. 18, 2017

(51) Int. Cl.
*G06F 1/16* (2006.01)
*F16M 13/04* (2006.01)

(52) U.S. Cl.
CPC ............. *G06F 1/163* (2013.01); *F16M 13/04* (2013.01)

(58) Field of Classification Search
CPC ................................ G06F 1/163; F16M 13/04
USPC .......................... 361/679.01, 679.02, 679.03
See application file for complete search history.

(56) References Cited

U.S. PATENT DOCUMENTS

| | | | |
|---|---|---|---|
| 3,406,589 A | 10/1968 | Gaber | |
| 3,492,037 A | 1/1970 | Hutchinson | |
| 3,704,353 A | 11/1972 | Halla | |
| 5,004,276 A | 4/1991 | Hanley | |
| 5,657,969 A | 8/1997 | Bivens | |
| 6,669,250 B1 | 12/2003 | St. Louis | |
| 7,667,962 B2 * | 2/2010 | Mullen | G06F 1/1624 359/461 |
| 7,904,128 B2 | 3/2011 | Harmon et al. | |
| 8,971,023 B2 * | 3/2015 | Olsson | G02C 5/12 345/8 |
| 9,423,842 B2 * | 8/2016 | Osterhout | G06F 1/206 |
| 9,442,522 B2 * | 9/2016 | Tussy | G06F 1/1635 |
| 9,585,285 B2 * | 2/2017 | Nikkhoo | H05K 7/20127 |

OTHER PUBLICATIONS

Phillip Yee et al.; Adjustable Facial-Interface Systems for Head-Mounted Displays; U.S. Appl. No. 15/638,334; filed Jun. 29, 2017.
Phillip Yee et al.; Adjustable Facial-Interface Systems for Head-Mounted Displays; U.S. Appl. No. 15/637,366; filed Jun. 29, 2017.
Sullivan et al.; Facial-Interface Systems for Head-Mounted Displays; U.S. Appl. No. 15/495,775; filed Apr. 24, 2017.
Phillip Yee et al.; Adjustable Facial-Interface Systems for Head-Mounted Displays; U.S. Appl. No. 15/652,550; filed Jul. 18, 2017.

* cited by examiner

*Primary Examiner* — Anthony Haughton
(74) *Attorney, Agent, or Firm* — FisherBroyles, LLP

(57) ABSTRACT

A facial-interface system for a head-mounted display may include a facial interface and a facial-interlace adjustment apparatus. The facial-interface adjustment apparatus may include (1) an extending member that includes a mounting portion that is coupled to the facial interface and that defines an adjustment groove, and (2) an adjustment lever that includes an adjustment protrusion that protrudes into the adjustment groove. The adjustment lever may be rotatable about a pivot to move the adjustment protrusion along the adjustment groove. The extending member may be movable between a contracted holding position and an extended holding position by the adjustment protrusion as the adjustment protrusion moves along the adjustment groove. Various other apparatuses, systems, and methods are also disclosed.

20 Claims, 10 Drawing Sheets

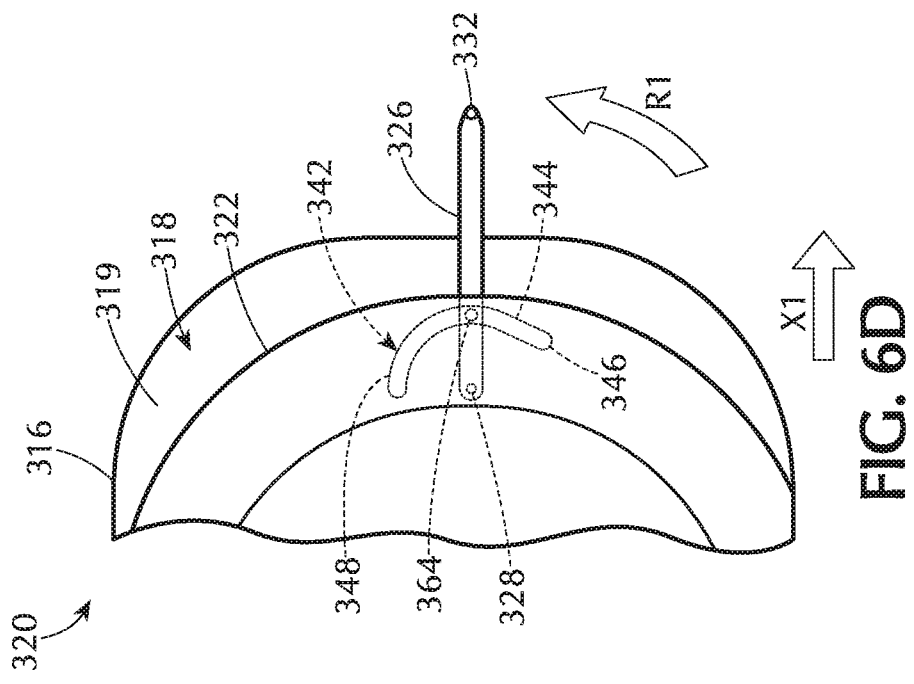
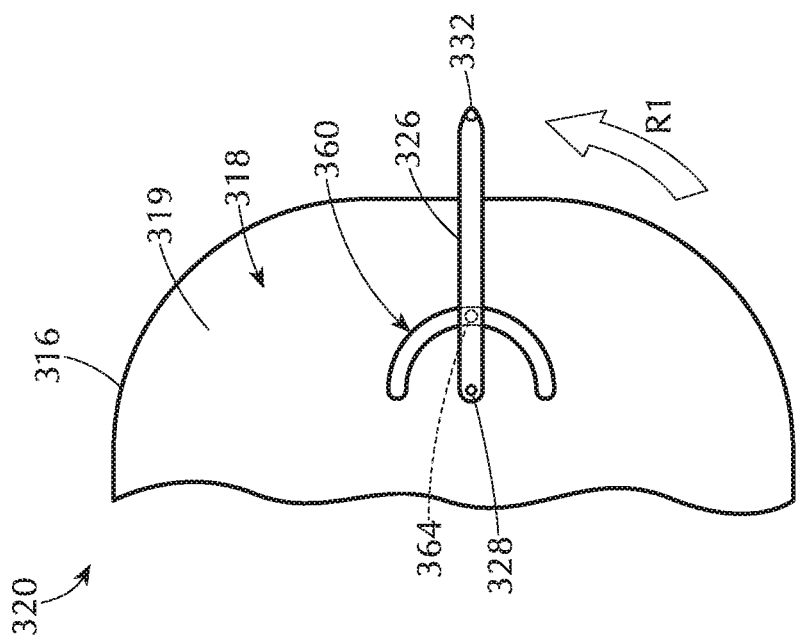

ADJUSTABLE FACIAL-INTERFACE SYSTEMS FOR HEAD-MOUNTED DISPLAYS

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation—governments may use them for military training simulations, doctors may use them to practice surgery, and engineers may use them as visualization aids.

Conventional virtual reality headsets often include cushioned facial interfaces that allow users to position the headsets on their faces. However, a particular cushioned facial interface may not comfortably fit users having various head or face shapes or users who also wear glasses while wearing head-mounted displays. Unfortunately, in order to adjust the fit of a facial interface, users must typically remove a facial-interface cushion from a facial interface and replace it with a cushion of a different size to obtain a desired fit. Accordingly, users often cannot properly adjust the fit of a headset without having a replacement facial interface or interface cushion available.

SUMMARY

As will be described in greater detail below, the instant disclosure generally relates to adjustable facial-interface systems for head-mounted displays, head-mounted-display devices, and methods for assembling adjustable facial-interface systems. In one example, a facial-interface system for a head-mounted display may include a facial interface and a facial-interface adjustment apparatus. The facial-interface adjustment apparatus may include (1) an extending member that includes a mounting portion that is coupled to the facial interface and that defines an adjustment groove, and (2) an adjustment lever that includes an adjustment protrusion that protrudes into the adjustment groove. The adjustment lever may be rotatable about a pivot to move the adjustment protrusion along the adjustment groove. The extending member may be movable between a contracted holding position and an extended holding position by the adjustment protrusion as the adjustment protrusion moves along the adjustment groove.

In some embodiments, the adjustment lever may be rotatable about the pivot in a first rotational direction to move the extending member in an extending direction. The adjustment may also be rotatable about the pivot in a second rotational direction to move the extending member in a contracting direction opposite the extending direction. The adjustment groove may include a displacing section that follows a displacing path that is not congruent with a partial-circular path followed by the adjustment protrusion as the adjustment lever is rotated about the pivot. In this example, the extending member may be forced between the contracted holding position and the extended holding position by the adjustment protrusion as the adjustment protrusion moves along the displacing section of the adjustment groove. In at least one example, the adjustment groove may include a contracted holding section adjacent to a first end of the displacing section and an extended holding section adjacent to a second end of the displacing section. The extending member may be disposed in the contracted holding position when the adjustment protrusion is disposed in the contracted holding section of the adjustment groove and the extending member may be disposed in the extended holding position when the adjustment protrusion is disposed in the extended holding section of the adjustment groove. In some examples, the extended holding section may follow a holding path that is not parallel to the displacing path followed by the displacing section. In at least one example, the extended holding section may follow a holding path that is congruent with a portion of the partial-circular path followed by the adjustment protrusion as the adjustment lever is rotated about the pivot.

According to at least one embodiment, the facial-interface adjustment apparatus may include a spring that biases the extending member in the contracting direction. In some examples, an axis of rotation of the adjustment lever about the pivot may extend in an axial direction that is substantially perpendicular to the extending direction and the contracting direction. The facial-interface adjustment apparatus may also include a support member that supports at least a portion of the extending member such that extending member moves relative to the support member as the extending member is forced between the contracted holding position and the extended holding position. In this example, the support member may be located between the facial interface and the pivot. The adjustment lever may extend through a lever channel defined in the support member and the adjustment lever may move along at least a portion of the lever channel as the adjustment lever is rotated about the pivot. In some examples, the adjustment protrusion may protrude in a direction that is substantially parallel to an axis of rotation of the adjustment lever about the pivot. The facial interface may be disposed at a separate one of a plurality of locations relative to the pivot when the adjustment protrusion of the adjustment lever is held at each of the contracted holding position and the extended holding position.

A corresponding head-mounted-display device may include (1) a facial interface, (2) a head-mounted-display housing, and (3) a facial-interface adjustment apparatus coupled to the head-mounted-display housing. In some examples, the extending member may move along an interior surface portion of the head-mounted-display housing when the extending member is forced between the contracted holding position and the extended holding position. The facial interface may be disposed at a separate location relative to the head-mounted-display housing when the adjustment protrusion of the adjustment lever is held at each of the contracted holding position and the extended holding position.

A corresponding method may include positioning an adjustment protrusion of an adjustment lever within an adjustment groove defined by an extending member of a facial-interface adjustment apparatus for a head-mounted-display device such that (1) the adjustment lever is rotatable about a pivot to move the adjustment protrusion along the adjustment groove, and (2) the extending member is movable between a contracted holding position and an extended holding position by the adjustment protrusion as the adjustment protrusion moves along the adjustment groove. The method may also include coupling a facial interface to a mounting portion of the extending member. In some examples, the method may include coupling the facial-interface adjustment apparatus to a head-mounted-display device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 4A and 46 are perspective views of a portion of an exemplary facial-interface adjustment apparatus coupled to a head-mounted-display housing in accordance with some embodiments.

FIGS. 6A-6F are side views of a portion of an exemplary facial-interface adjustment apparatus coupled to a head-mounted-display housing in accordance with some embodiments.

Figure 1:
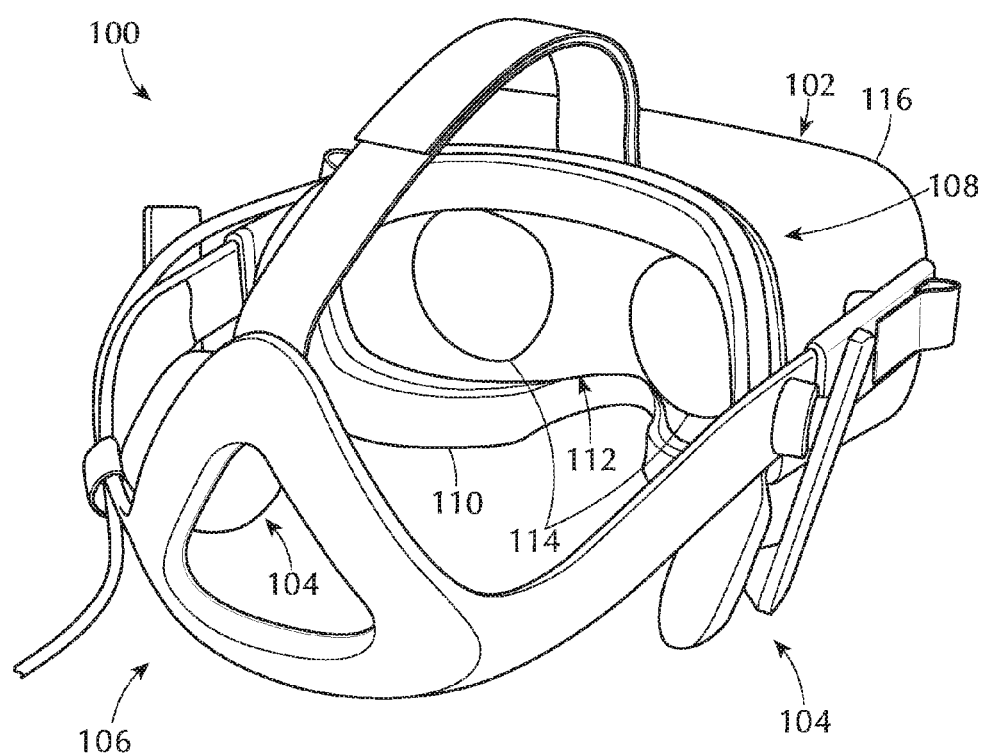
FIG. 1 is a perspective view of an exemplary head-mounted-display system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various adjustable facial-interface systems for head-mounted displays, head-mounted-display devices, and methods for assembling adjustable facial-interface systems. As will be explained in greater detail below, embodiments of the instant disclosure may include facial-interface systems having facial-interface adjustment apparatuses that enable users to quickly and easily adjust facial interfaces. The facial-interface adjustment apparatuses may each include an adjustment lever that is rotatable to move an extending member between a plurality of holding positions. Rotational movement of the adjustment lever may be translated to linear movement of the extending member. A facial interface may be coupled to the extending member so that the extending member adjusts the position of the facial interface with respect to a head-mounted-display housing. The facial-interface systems may thus enable users to position the facial interfaces so as to comfortably fit head-mounted displays to various user face sizes and shapes. The facial-interface systems may also enable users to wear accessories, such as glasses, while wearing the head-mounted displays. Accordingly, the facial-interface systems may allow users to adjust and comfortably wear head-mounted displays without having to replace the facial interfaces and/or interface cushions.

The following will provide, with reference to FIG. 1, examples of head-mounted-display systems. In addition, the discussion corresponding to FIGS. 2-6F will provide examples of adjustable facial-interface systems and facial-interface adjustment apparatuses. Finally, the discussion corresponding to FIG. 7 will provide examples of methods for assembling adjustable facial-interface systems.

FIG. 1 is a perspective view of a head-mounted-display system 100 in accordance with some embodiments. In some embodiments, head-mounted-display system 100 may include a head-mounted-display device 102 (i.e., head-mounted display), audio subsystems 104, a strap assembly 106, and a facial-interface system 108. The term "head-mounted display," as used herein, generally refers to any type or form of display device or system that is worn on or about a user's head and displays visual content to the user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI). Head-mounted-display device 102 may include a head-mounted-display housing 116 surrounding various components of head-mounted-display device 102, including lenses 114 and various electronic components, including display components as described above.

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

In some embodiments, audio subsystems 104 may be integrated with head-mounted-display device 102 and may provide audio signals to the user's ears. Head-mounted-display system 100 may, for example, have two audio subsystems 104 located on the left and right sides of head-mounted-display system 100 to provide audio signals to the user's left and right ears, as shown in FIG. 1.

Strap assembly 106 may be used for adjustably mounting head-mounted-display device 102 on the user's head. As shown in FIG. 1, strap assembly 106 may include various straps, such as an upper strap and lower straps, that are coupled to head-mounted-display device 102 to adjustably conform to the top and/or sides of the user's head when the user is wearing head-mounted-display device 102.

In some embodiments, facial-interface system 108 may be configured to comfortably rest against a region of the user's face, including a region surrounding the user's eyes, when head-mounted-display system 100 is worn by the user. In these embodiments, facial-interface system 108 may include a facial interface 110 that contacts selected regions of the user's face. Facial interface 110 may surround a viewing region 112 that includes the user's field of vision while the user is wearing head-mounted-display system 100, allowing the user to look through lenses 114 of head-mounted-display device 102 without interference from outside light while the user s wearing head-mounted-display system 100.

Figure 2:
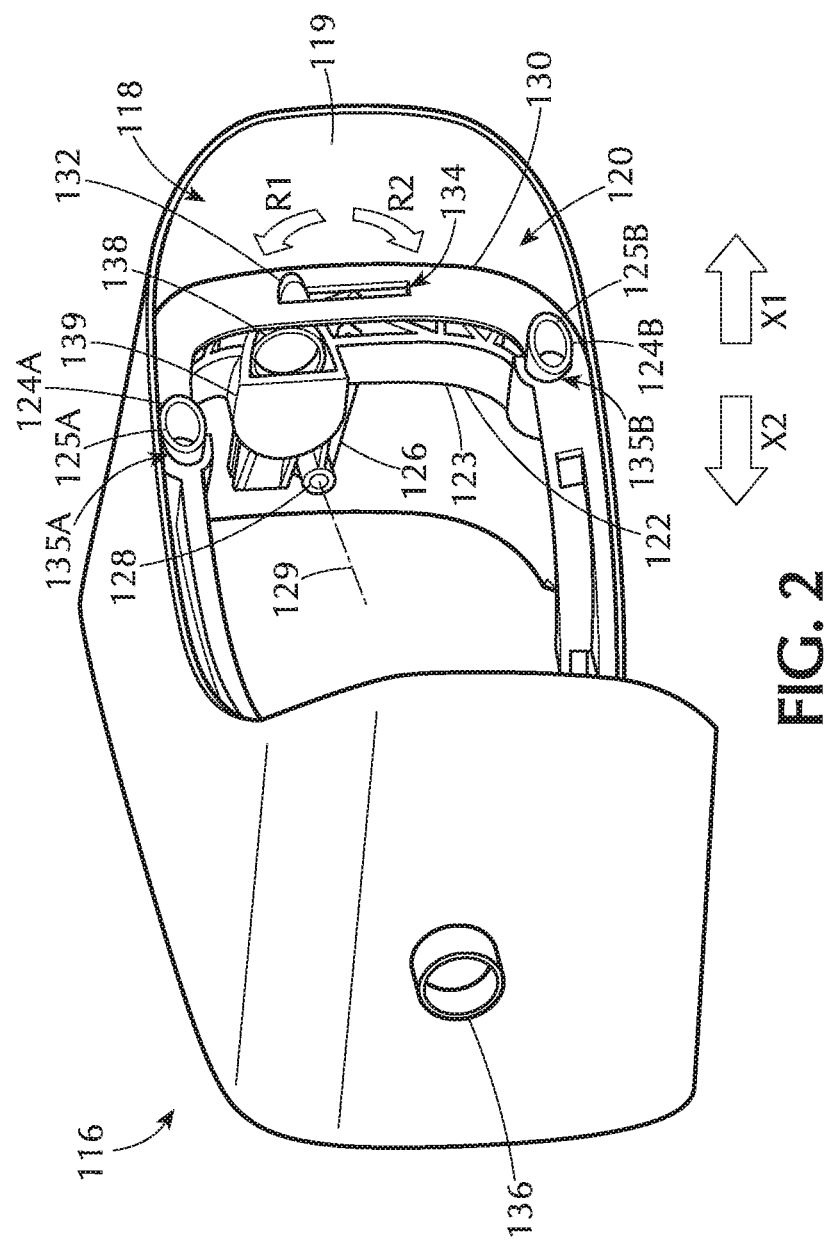
FIG. 2 is a perspective view of an exemplary facial-interface adjustment apparatus coupled to a head-mounted-display housing in accordance with some embodiments.

FIG. 2 shows a facial-interface adjustment apparatus 120 coupled to head-mounted-display housing 116. Facial-interface system 108 shown in FIG. 1 may include at least one facial-interface adjustment apparatus 120 as shown in FIG. 2. Facial-interface adjustment apparatus 120 may be fully or partially disposed within a housing interior 118 defined within head-mounted-display housing 116 by an interior surface 119 of head-mounted-display housing 116. In some embodiments, facial-interface system 108 may include a plurality of facial-interface adjustment apparatuses disposed in any suitable location within head-mounted-display housing 116. For example, while FIG. 2 illustrates facial-interface adjustment apparatus 120 disposed in at right side of head-mounted-display housing 116, facial-interface system 108 may include at least one additional facial-interface adjustment apparatus in, for example, a left side of head-mounted-display housing 116.

As shown in FIG. 2, facial-interface adjustment apparatus 120 may include an extending member 122 that is movable within head-mounted-display housing 116 in an extending direction X1 and a contracting direction X2 opposite extending direction X1. Extending member 122 may include at least one mounting portion for coupling facial interface 110 to extending member 122 (see, e.g., FIGS. 3A and 3B). For example, extending member 122 may include a mounting portion 124A and a mounting portion 124B positioned at separate locations within head-mounted-display housing 116 (e.g., upper and lower locations within head-mounted-display housing 116). In at least one example, mounting portion 124A and mounting portion 124B may each protrude in extending direction X1 from a main body portion 123 of extending member 122. Mounting portion 124A and a mounting portion 124B may respectively include a mounting surface 125A and a mounting surface 125B that are shaped and configured to abut facial interface 110. Main body portion 123 of extending member 122 may be disposed adjacent to a portion of interior surface 119 of head-mounted-display housing 116. For example, main body portion 123 may be disposed in close proximity to and/or abutting a portion of interior surface 119 such that main body portion 123 is movable along the portion of interior surface 119 in extending direction X1 and contracting direction X2.

According to some embodiments, facial-interface adjustment apparatus 120 may include an adjustment lever 126 that movably interfaces with extending member 122 to force extending member 122 in extending direction X1 and contracting direction X2, as will be described in greater detail below in reference to FIGS. 3A and 3B. Adjustment lever 126 may be rotatable about a pivot 128 in a rotational direction R1 and a rotational direction R2 opposite rotational direction R1. An axis of rotation 129 of adjustment lever 126 about pivot 128 may extend in an axial direction that is perpendicular or substantially perpendicular to extending direction X1 and contracting direction X2. In at least one example, adjustment lever 126 may extend beyond main body portion 123 of extending member 122 in extending direction X1. For example, adjustment lever 126 may extend beyond main body portion 123, with a portion of adjustment lever 126 being disposed between main body portion 123 and an adjacent portion of interior surface 119 of head-mounted-display housing 116.

In at least one embodiment, facial-interface adjustment apparatus 120 may include a support member 130 that supports at least a portion of extending member 122. For example, support member 130 may support at least a portion of extending member 122, such as mounting portion 124A and/or mounting portion 124B, so as to hold extending member 122 in a specified orientation and/or position within head-mounted-display housing 116 and confine movement of extending member 122 to extending direction X1 and contracting direction X2. Extending member 122 may be movable relative to support member 130 in extending direction X1 and contracting direction X2 as extending member 122 is respectively forced in extending direction X1 and contracting direction X2 by adjustment lever 126. In some examples, mounting portion 124A and/or mounting portion 124B may extend through a corresponding support opening defined in support member 130. For example, mounting portion 124A may extend through a support-member opening 135A and mounting portion 124B may extend through a support-member opening 135B. A portion of support member 130 defining support-member opening 135A and/or support-member opening 135B may respectively conform to an exterior shape of mounting portion 124A and/or mounting portion 124B.

In some embodiments, a portion of adjustment lever 126 may extend beyond support member 130 in extending direction X1. For example, as shown in FIG. 2, adjustment lever 126 may extend through a lever channel 134 defined in support member 130 to a lever end portion 132 of adjustment lever 126. Adjustment lever 126 may be movable along at least a portion of lever channel 134 defined in support member 130 as adjustment lever 126 is rotated in rotational direction R1 and rotational direction R2. Lever end portion 132 of adjustment lever 126 may be positioned so that a user may interface with lever end portion 132 to force adjustment lever 126 along lever channel 134 in rotational direction R1 and rotational direction R2.

According to at least one embodiment, head-mounted-display housing 116 may include a strap mounting base 136 for mounting a portion of a strap assembly (see strap assembly 106 illustrated in FIG. 1) to head-mounted-display housing 116. Strap mounting base 136 may include a mounting base portion 138 that extends into housing interior 118 of head-mounted-display housing 116. Extending member 122 may include a base surrounding portion 139 that surrounds at least a portion of mounting base portion 138 such that mounting base portion 138 and/or a portion of a strap assembly coupled to mounting base portion 138 does not interfere with movement of extending member 122 in extending direction X1 and contracting direction X2. Components of facial-interface adjustment apparatus 120 may be formed of any suitable material, without limitation. For example, extending member 122, adjustment lever 126, pivot 128, and/or support member 130 may include a rigid and/or semi-rigid material, such as a polymeric and/or metal material.

Figure 3A:
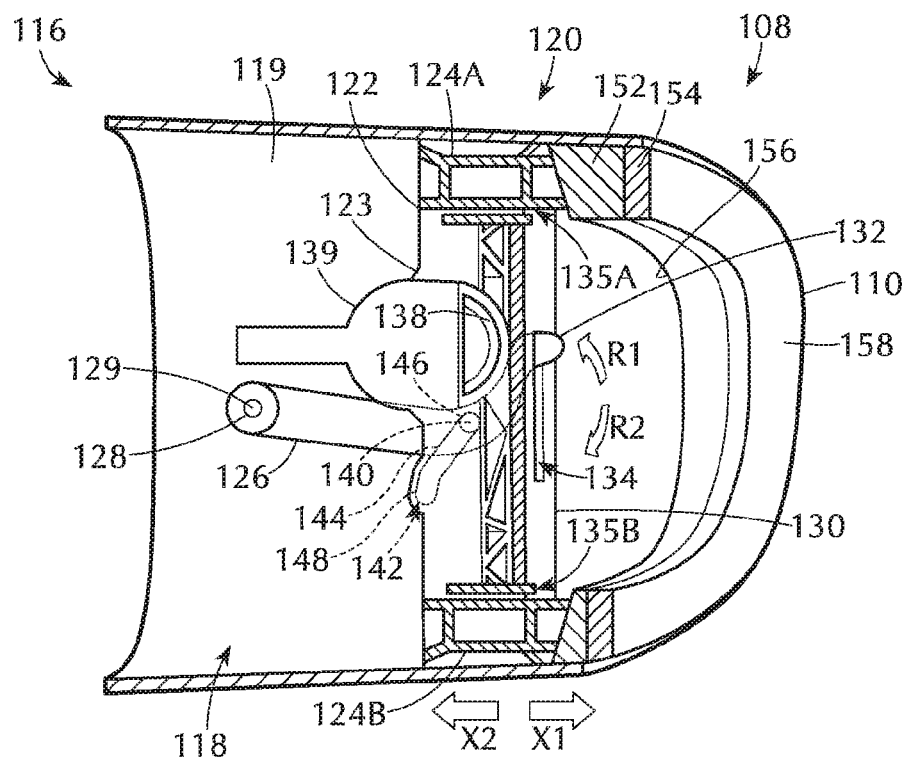
FIGS. 3A and 3B are cross-sectional side views an exemplary facial-interface adjustment apparatus coupled to a head-mounted-display housing and a facial interface in accordance with some embodiments.
Figure 3B:
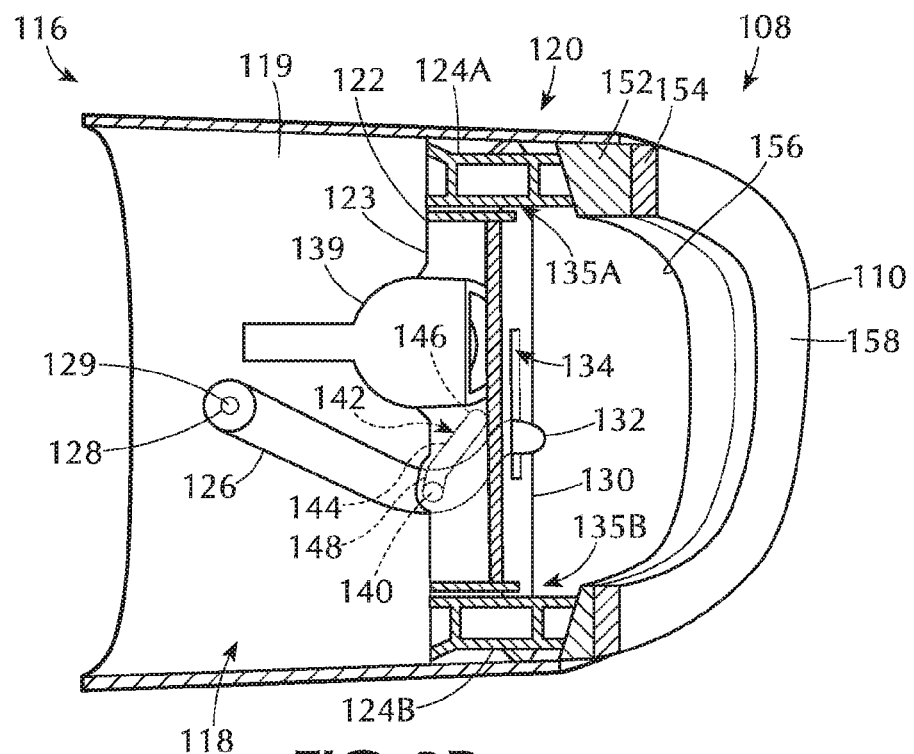

FIGS. 3A and 3B show facial-interface adjustment apparatus 120 coupled to head-mounted-display housing 116 and facial interface 110. As shown in these figures, facial-interface system 108, which includes facial-interface adjustment apparatus 120 and facial interface 110, may be coupled to head-mounted-display housing 116 such that facial interface 110 is movable between various holding positions with respect to head-mounted-display housing 116 through adjustment of facial-interface adjustment apparatus 120. FIG. 3A illustrates extending member 122 and facial interface 110 in a contracted holding position and FIG. 3B illustrates extending member 122 and facial interface 110 in an extended holding position.

Facial interface 110 may include an interface cushion 154 attached to an interface backing 152. In some embodiments, interface cushion 154 may include or be formed from a pliable material. For example, interface cushion 154 may include or be formed from a foam material (e.g., polyurethane foam) and/or any other pliable material suitable for contacting a facial region of a user and/or suitable for conforming to a shape of interface backing 152. In some examples, the pliable material may enable interface cushion 154 to conform to an attachment surface of interface backing 152. In at least one example, interface cushion 154 may include multiple cushion layers and/or a covering layer over at least a portion of interface cushion 154. Interface backing 152 may be formed of a material having greater rigidity than interface cushion 154, such as a rigid or semi-rigid polymeric and/or metal material.

Interface cushion 154 may include a facial-abutment surface 158 that is configured to abut facial regions of the user when head-mounted-display system 100 shown in FIG. 1 is worn by the user. For example, facial-abutment surface 158 may be configured to abut at least a portion of the user's nose, cheek, temple, and/or forehead facial regions. Interface cushion 154 may be mounted to interface backing 152 at a side of interface cushion 154 opposite facial-abutment surface 158. Interface backing 152 may include a backing surface 156 on a side of interface backing 152 opposite interface cushion 154. In some embodiments, backing surface 156 of interface backing 152 may abut at least a portion of mounting portion 124A and/or mounting portion 124B, such as mounting surface 125A and/or mounting surface 125B.

In some embodiments, support member 130 may be located between facial interface 110 and at least a portion of extending member 122 and/or at least a portion of adjustment lever 126. For example, as shown in FIGS. 3A and 3B, support member 130 may be disposed between facial interface 110 and pivot 128 and/or between facial interface 110 and main body portion 123 of extending member 122. Support member 130 and/or pivot 128 may be coupled to at least a portion of head-mounted-display housing 116 such that pivot 128 and/or support member 130 remains stationary with respect to head-mounted-display housing 116 as extending member 122 moves between the extended holding position and the contracted holding position. Accordingly, extending member 122 may be movable with respect to support member 130 and/or pivot 128 in extending direction X1 and contracting direction X2 between the contracted holding position shown in FIG. 3A and the extended holding position shown in FIG. 3B.

According to some embodiments, extending member 122 may define an adjustment groove 142 for adjusting the position of extending member 122 in combination with rotation of adjustment ever 126. Adjustment groove 142 may extend partially or fully through a width of extending member 122. For example, as shown in FIGS. 3A and 3B, adjustment groove 142 may be a recessed groove that faces a portion of adjustment lever 126. Adjustment lever 126 may include an adjustment protrusion 140 that protrudes into adjustment groove 142 defined in main body portion 123 of extending member 122. In at least one example, adjustment protrusion 140 may protrude in a direction that is parallel or substantially parallel to axis of rotation 129 of adjustment lever 126 about pivot 128. Adjustment protrusion 140 may be positioned such that adjustment protrusion 140 remains within adjustment groove 142 as adjustment lever 126 is rotated in rotational direction R1 and rotational direction R2. Adjustment lever 126 may be rotatable about pivot 128 in rotational direction R2 to move extending member 122 in extending direction X1 from the contracted holding position shown in FIG. 3A to the extended holding position shown in FIG. 3B. Additionally, adjustment lever 126 may be rotatable about pivot 128 in rotational direction R1 to move extending member 122 in contracting direction X2 from the extended holding position to the contracted holding position.

Adjustment groove 142 defined in main body portion 123 of extending member 122 may include a displacing section 144 that follows a displacing path. The displacing path along which displacing section 144 of adjustment groove 142 extends may not be congruent with a partial-circular path followed by adjustment protrusion 140 with respect to pivot 128 as adjustment lever 126 is rotated about pivot 128 in rotational direction R1 and rotational direction R2. For example, as shown in FIGS. 3A and 3B, displacing section 144 may follow a linear or substantially linear path that is not parallel to extending direction X1 or contracting direction X2. Additionally or alternatively, at least a portion of displacing section 144 may follow a nonlinear path (e.g., an arcuate path) that is incongruent with the partial-circular path followed by adjustment protrusion 140 with respect to pivot 128. Accordingly, as adjustment protrusion 140 is rotated in rotational direction R1 or rotational direction R2, adjustment protrusion 140 may impinge on a portion of extending member 122 defining displacing section 144 so as to force extending member 122 in extending direction X1 or contracting direction X2. Thus, the rotational movement of adjustment lever 126 in rotational direction R1 and rotational direction R2 may be translated to linear movement of extending member 122 in extending direction X1 and contracting direction X2 as adjustment protrusion 140 moves along displacing section 144.

For example, as adjustment lever 126 is rotated in rotational direction R2 when adjustment protrusion 140 is disposed in displacing section 144 of adjustment groove 142, adjustment protrusion 140 may apply a force to a portion of extending member 122 defining displacing section 144 in extending direction X1 such that extending member 122 is moved in extending direction X1 from the contracted holding position to the extended holding position. Additionally, as adjustment lever 126 is rotated in rotational direction R1 when adjustment protrusion 140 is disposed in displacing section 144, adjustment protrusion 140 may apply a force to another portion of extending member 122 defining displacing section 144 in contracting direction X2 such that extending member 122 is moved in contracting direction X2 from the extended holding position to the contracted holding position.

In some embodiments, adjustment groove 142 may include a contracted holding section 146 adjacent to a first end of displacing section 144 and an extended holding section 148 adjacent to a second end of displacing section 144. As shown in FIG. 3A, extending member 122 may be disposed in the contracted holding position when adjustment protrusion 140 is disposed in contracted holding section 146.

As shown in FIG. 3B, extending member 122 may be disposed in the extended holding position when adjustment protrusion 140 is disposed in extended holding section 148. In at least one example, extended holding section 148 may follow a linear or nonlinear holding path that is not parallel to the displacing path followed by displacing section 144. For example, the holding path followed by extended holding section 148 may have a greater slope than the displacing path followed by displacing section 144 with respect to extending direction X1 and contracting direction X2.

Extended holding section 148 of adjustment groove 142 may be shaped and oriented such that adjustment protrusion 140 is securely held within extended holding section 148 when extending member 122 is in the extended holding position as illustrated in FIG. 33. Extended holding section 148 of adjustment groove 142 may securely hold adjustment protrusion 140 when extending member 122 is in the extended holding position until adjustment protrusion 140 is rotated out of extended holding section 148 by a user via adjustment lever 126, thereby preventing extending member 122 from inadvertently moving out of the extended holding position. As such, extending member 122 and facial interface 110 coupled to extending member 122 may be held in the extended holding position when a force is applied to extending member 122 via facial interface 110 by a user's head when head-mounted-display system 100 (see FIG. 1) is secured to the user's head. Additionally, adjustment protrusion 140 may be held within contracted holding section 146 so that extending member 122 and facial interface 110 are held in the contracted holding position shown in FIG. 3A when a force is applied to extending member 122 via facial interface 110 by the user's head. For example, when extending member 122 is in the contracted holding position, a force applied by the user's head to extending member 122 via facial interface 110 may force a portion of extending member 122 defining contracted holding section 146 against adjustment protrusion 140 in contracting direction X2, thereby preventing movement of adjustment protrusion 140 away from contracted holding section 146.

Figure 4A:
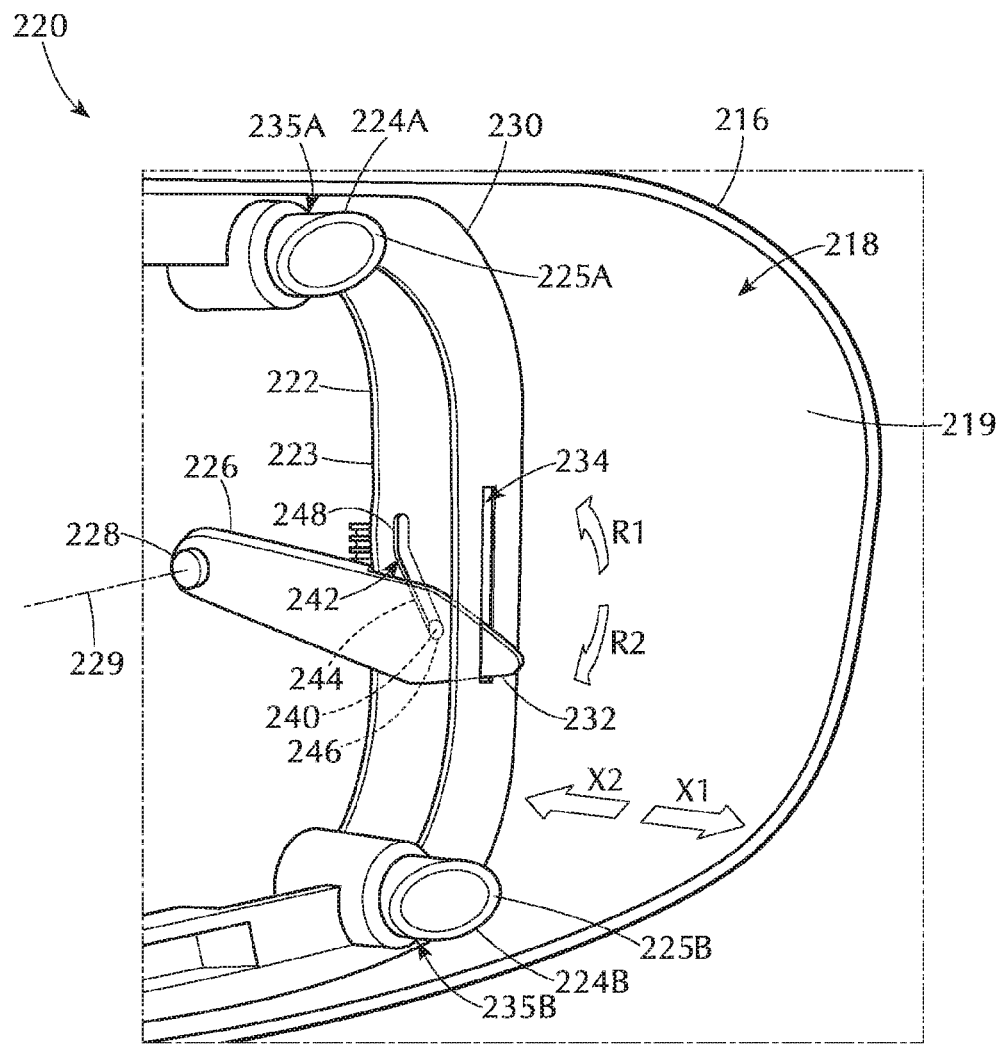
Figure 4B:
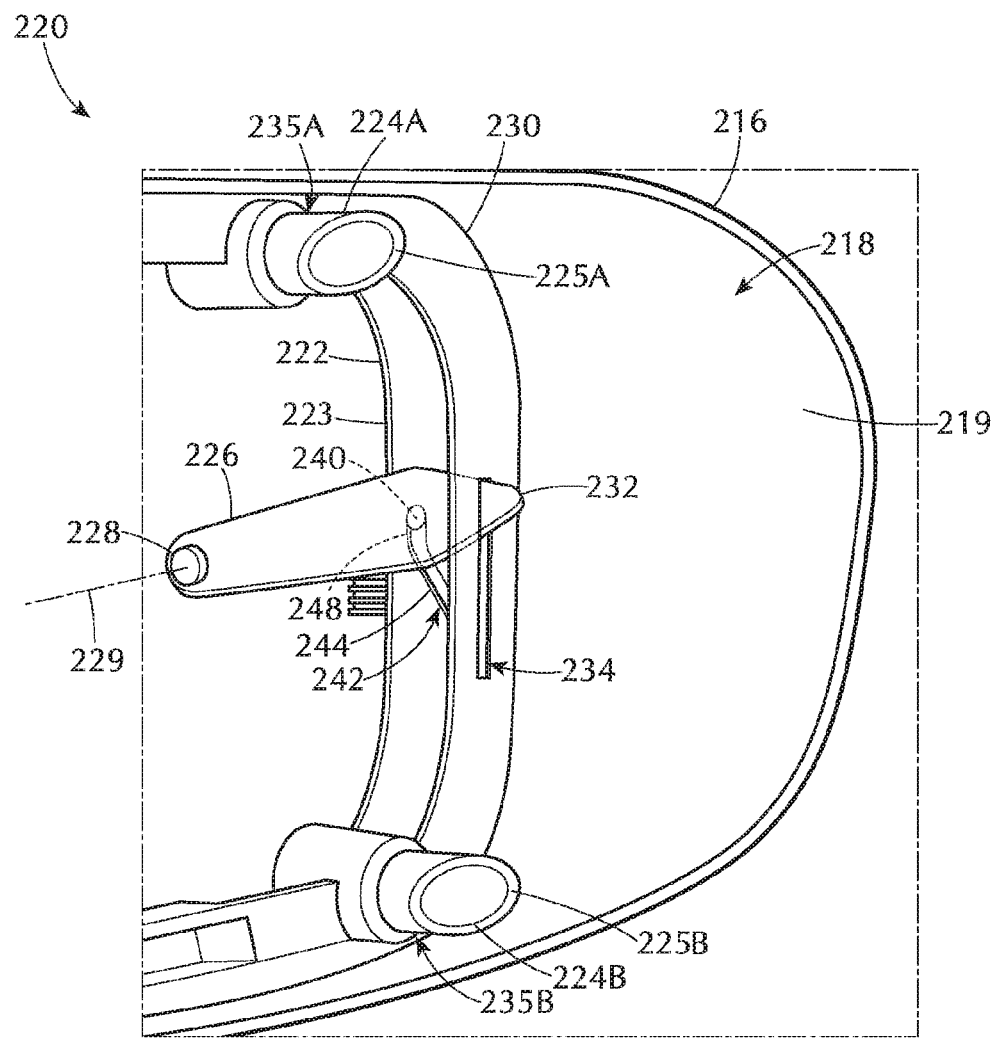

FIGS. 4A and 4B show a facial-interface adjustment apparatus 220 coupled to a head-mounted-display housing 216. As shown these figures, facial-interface adjustment apparatus 220 may include an extending member 222 that is movable within head-mounted-display housing 216 in an extending direction X1 and a contracting direction X2 opposite extending direction X1. FIG. 4A illustrates extending member 222 in a contracted holding position and FIG. 4B illustrates extending member 222 in an extended holding position. Extending member 222 may include at least one mounting portion for coupling a facial interface (see, e.g., facial interface 110 shown in FIGS. 3A and 3B) to extending member 222. For example, extending member 222 may include a mounting portion 224A and a mounting portion 224B positioned at separate locations within head-mounted-display housing 216 (e.g., upper and lower locations within head-mounted-display housing 216). Mounting portion 224A and a mounting portion 224B may respectively include a mounting surface 225A and a mounting surface 225B that are shaped and configured to abut the facial interface. In some embodiments, extending member 222 may include a main body portion 223 that is disposed adjacent to a portion of interior surface 219 of head-mounted-display housing 216.

According to some embodiments, facial-interface adjustment apparatus 220 may include an adjustment lever 226 that movably interfaces with extending member 222 to force extending member 222 in extending direction X1 and contracting direction X2. Adjustment lever 226 may be rotatable about a pivot 228 in a rotational direction R1 and a rotational direction R2 opposite rotational direction R1. An axis of rotation 229 of adjustment lever 226 about pivot 228 may extend in an axial direction that is perpendicular or substantially perpendicular to extending direction X1 and contracting direction X2. In at least one example, adjustment lever 226 may extend beyond main body portion 223 of extending member 222 in extending direction X1.

In at least one embodiment, facial-interface adjustment apparatus 220 may include a support member 230 that supports at least a portion of extending member 222. For example, support member 230 may support at least a portion of extending member 222, such as mounting portion 224A and/or mounting portion 224B, so as to hold extending member 222 in a specified orientation and/or position within head-mounted-display housing 216 and confine movement of extending member 222 to extending direction X1 and contracting direction X2. Extending member 222 may be movable relative to support member 230 in extending direction X1 and contracting direction X2 as extending member 222 is respectively forced in extending direction X1 and contracting direction X2 by adjustment lever 226. In some examples, mounting portion 224A and/or mounting portion 224B of extending member 222 may extend through a corresponding support opening defined in support member 230. For example, mounting portion 224A may extend through a support-member opening 235A and mounting portion 224B may extend through a support-member opening 235B.

In some embodiments, a portion of adjustment lever 226 may extend beyond support member 230 in extending direction X1. For example, as shown in FIGS. 4A and 4B, adjustment lever 226 may extend through a lever channel 234 defined in support member 230 to a lever end portion 232 of adjustment lever 226. Adjustment lever 226 may be movable along at least a portion of lever channel 234 defined in support member 230 as adjustment lever 226 is rotated in rotational direction R1 and rotational direction R2. Lever end portion 232 of adjustment lever 226 may be positioned so that a user may interface with lever end portion 232 to force adjustment lever 226 along lever channel 234 in rotational direction R1 and rotational direction R2. Support member 230 and/or pivot 228 may be coupled to at least a portion of head-mounted-display housing 216 such that pivot 228 and/or support member 230 remains stationary relative to head-mounted-display housing 216 as extending member 222 moves between the extended holding position and the contracted holding position. Accordingly, extending member 222 may be movable with respect to support member 230 and/or pivot 228 in extending direction X1 and contracting direction X2 between the contracted holding position shown in FIG. 4A and the extended holding position shown in FIG. 4B.

According to some embodiments, extending member 222 may define an adjustment groove 242 for adjusting the position of extending member 222 in combination with rotation of adjustment lever 226. Adjustment lever 226 may include an adjustment protrusion 240 that protrudes into adjustment groove 242 defined in main body portion 223 of extending member 222. Adjustment protrusion 240 may be positioned such that adjustment protrusion 240 remains within adjustment groove 242 as adjustment lever 226 is rotated in rotational direction R1 and rotational direction R2. Adjustment lever 226 may be rotatable about pivot 228 in rotational direction R1 to move extending member 222 in extending direction X1 from the contracted holding position shown in FIG. 4A to the extended holding position shown in FIG. 4B. Additionally, adjustment lever 226 may be rotatable about pivot 228 in rotational direction R2 to move extending member 222 in contracting direction X2 from the extended holding position to the contracted holding position.

Adjustment groove 242 defined by main body portion 223 of extending member 222 may include a displacing section 244 that follows a displacing path that is not congruent with a partial-circular path followed by adjustment protrusion 240 with respect to pivot 228 as adjustment lever 226 is rotated about pivot 228 in rotational direction R1 and rotational direction R2. For example, as shown in FIGS. 3A and 3B, displacing section 244 may follow a linear or substantially linear path that is not parallel to extending direction X1 or contracting direction X2. Additionally or alternatively, displacing section 244 may follow a nonlinear path (e.g., an arcuate path) that is incongruent with the partial-circular path followed by adjustment protrusion 240 with respect to pivot 228. Accordingly, as adjustment protrusion 240 is rotated in rotational direction R1 or rotational direction R2, adjustment protrusion 240 may impinge on a portion of extending member 222 defining displacing section 244 so as to force extending member 222 in extending direction X1 or contracting direction X2. Thus, the rotational movement of adjustment lever 226 in rotational direction R1 or rotational direction R2 may be translated to linear movement of extending member 222 in extending direction X1 and contracting direction X2 as adjustment protrusion 240 moves along displacing section 244.

Adjustment groove 242 may include a contracted holding section 246 adjacent to a first end of displacing section 244 and/or an extended holding section 248 adjacent to a second end of displacing section 244. As shown in FIG. 4A, extending member 222 may be disposed in the contracted holding position when adjustment protrusion 240 is disposed in contracted holding section 246. As shown in FIG. 4B, extending member 222 may be disposed in the extended holding position when adjustment protrusion 240 is disposed in extended holding section 248. In at least one example, extended holding section 248 may follow a holding path that is not parallel to the displacing path followed by displacing section 244. Extended holding section 248 of adjustment groove 242 may be shaped and oriented such that adjustment protrusion 240 is securely held within extended holding section 248 when extending member 222 is in the extended holding position illustrated in FIG. 3B. As such, extending member 222 may be held in the extended holding position when a force is applied to extending member 222 via a facial interface (e.g., facial interface 110 shown in FIGS. 3A and 3B) by a user's head when a head-mounted-display system (see head-mounted-display system 100 in FIG. 1) is secured to the user's head. Additionally, adjustment protrusion 240 may be held within contracted holding section 246 so that extending member 222 is held in the contracted holding position shown in FIG. 4A when a force is applied to extending member 222 while the head-mounted-display system is worn by the user.

Figure 5:
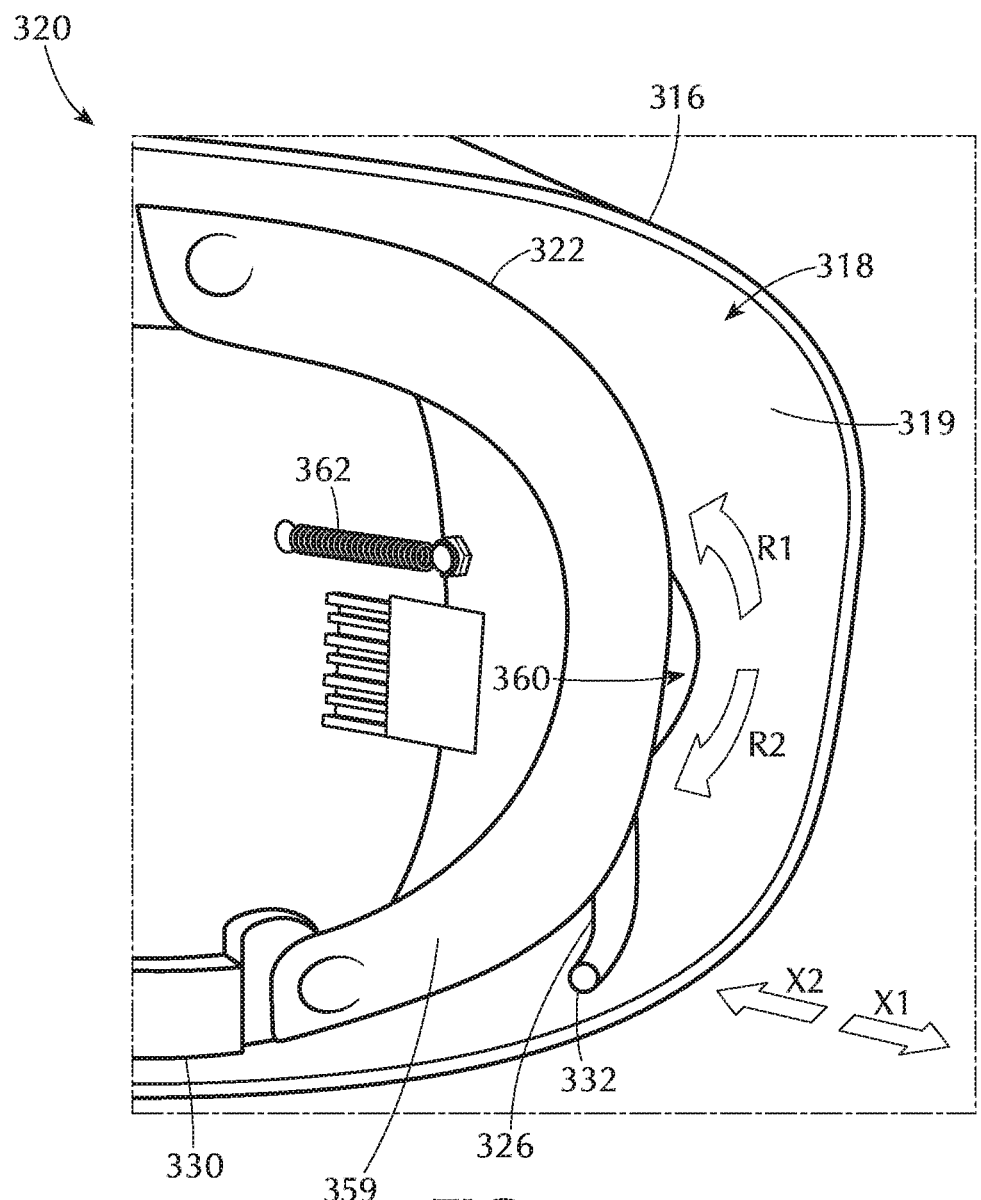
FIG. 5 is a perspective view of a portion of an exemplary facial-interface adjustment apparatus coupled to a head-mounted-display housing in accordance with some embodiments.
Figure 6B:
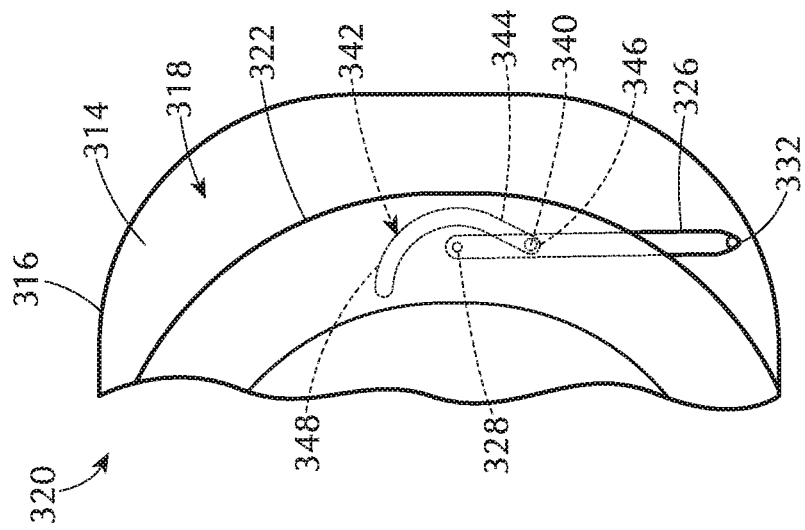
Figure 6A:
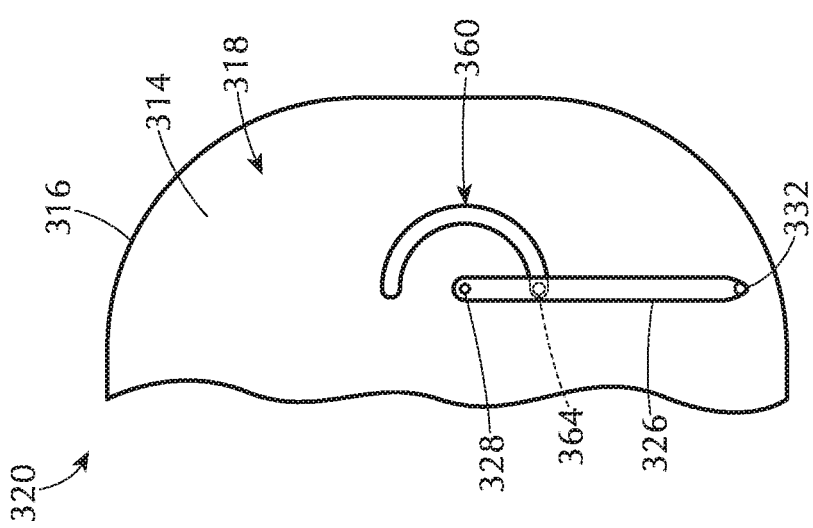
Figure 6F:
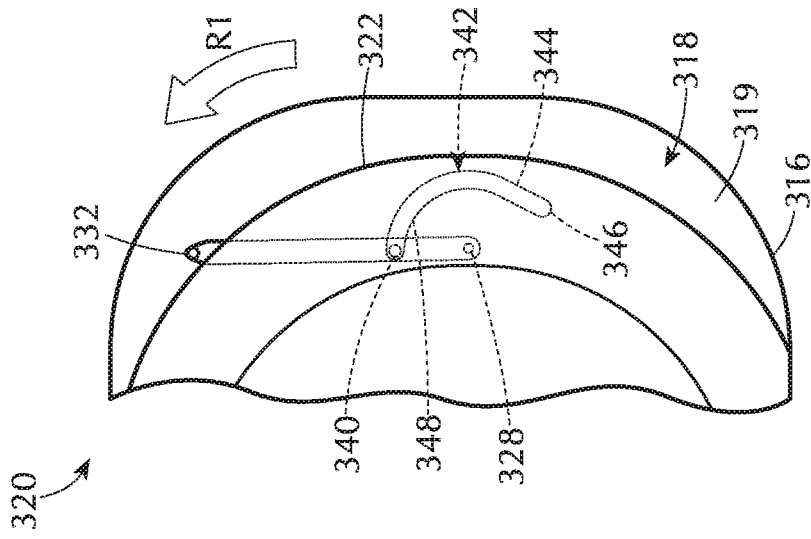

FIGS. 5-6F show a facial-interface adjustment apparatus 320 coupled to a head-mounted-display housing 316. As shown these figures, facial-interface adjustment apparatus 320 may include an extending member 322 that is movable within head-mounted-display housing 316 in an extending direction X1 and a contracting direction X2 opposite extending direction X1. Extending member 322 may include a mounting portion for coupling a facial interface (see, e.g., facial interface 110 shown in FIGS. 3A and 3B) to extending member 322. For example, extending member 322 may include a mounting surface 359 that is shaped and configured to abut the facial interface. Mounting surface 359 may be disposed adjacent to a portion of interior surface 319 of head-mounted-display housing 316.

According to some embodiments, as shown in FIG. 5, facial-interface adjustment apparatus 320 may include an adjustment lever 326 that movably interfaces with extending member 322 to force extending member 322 in extending direction X1 and contracting direction X2. Adjustment lever 326 may be rotatable about a pivot 328 (see FIGS. 6A-6E) in a rotational direction R1 and a rotational direction R2 opposite rotational direction R1. In at least one example, adjustment lever 326 may extend beyond a peripheral portion of extending member 322 to a lever end portion 332 of adjustment lever 326. Lever end portion 332 may be positioned so that a user may interface with lever end portion 332 to force adjustment lever 326 in rotational direction R1 and rotational direction R2. In some embodiments, a rotational groove 360 that follows an arcuate path may be defined in a portion of head-mounted-display housing 316 adjacent to adjustment lever 326. As will be described in greater detail below with reference to FIGS. 6A-6F, rotational groove 360 may guide movement of adjustment lever 326 in rotational direction R1 and rotational direction R2.

In at least one embodiment, facial-interface adjustment apparatus 320 may include a support member 330 that supports at least a portion of extending member 322. For example, support member 330 may support at least a portion of extending member 322 so as to hold extending member 322 in a specified orientation and/or position within head-mounted-display housing 316 and confine movement of extending member 322 to extending direction X1 and contracting direction X2. Extending member 322 may be movable relative to support member 330 in extending direction X1 and contracting direction X2 as extending member 322 is respectively forced in extending direction X1 and contracting direction X2 by adjustment lever 326.

In at least one embodiment, a spring 362 may be coupled to a portion of extending member 322. For example, one end of spring 362 may be coupled to head-mounted-display housing 316 and an opposite end of spring 362 may be coupled to a portion of extending member 322, as shown in FIG. 5. Spring 362 may, for example, be a tension spring that biases extending member 322 in contracting direction X2. Spring 362 may support a position and orientation of extending member 322 with respect to interior surface 319 of head-mounted-display housing 316. In some examples, spring 362 may additionally or alternatively facilitate movement of extending member 322 in extending direction X1 or contracting direction X2 as adjustment lever 326 is rotated in rotational direction R1 and rotational direction R2.

Figure 6E:
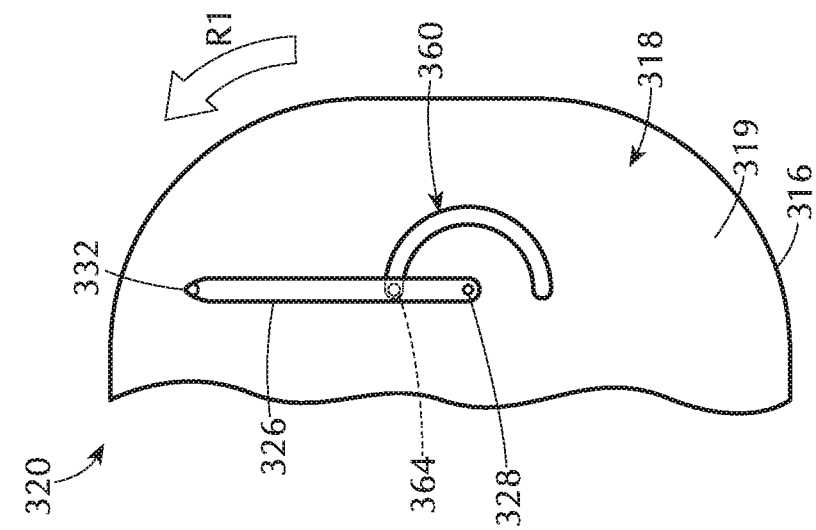

FIGS. 6A, 6C, and 6E illustrate a portion of facial-interface adjustment apparatus 320 coupled to head-mounted-display housing 316 without extending member 322 shown such that components of facial-interface adjustment apparatus 320 disposed between extending member 322 and head-mounted-display housing 316 are visible. FIGS. 6B, 6D, and 6F illustrate the portions of facial-interface adjustment apparatus 320 and head-mounted-display housing 316 respectively shown in FIGS. 6A, 6C, and 6E with extending member 322 being additionally shown in FIGS. 6B, 6D, and 6F. FIGS. 6A and 6B illustrate extending member 322 in a contracted holding position, FIGS. 6C and 6D illustrate extending member 322 in an extended position, and FIGS. 6E and 6F illustrate extending member 322 in an extended holding position.

As shown in FIG. 6A, adjustment lever 326 may be secured to a pivot 328 that is coupled to head-mounted-display housing 316. In some embodiments, adjustment lever 326 may include a rotational-groove protrusion 364 that protrudes from a side of adjustment lever 326 facing interior surface 319. Rotational-groove protrusion 364 may extend into rotational groove 360 defined in head-mounted-display housing 316. Rotational groove 360 may follow a partial-circular path that is congruent with a partial-circular path followed by rotational-groove protrusion 364 as adjustment lever 326 is rotated about pivot 328 in rotational direction R1 and rotational direction R2 (see, e.g., FIG. 5). Accordingly, rotational-groove protrusion 364 may move along rotational groove 360 during rotation of adjustment lever 326 about pivot 328 such that rotational groove 360 supports and/or guides adjustment lever 326 in rotational direction R1 and rotational direction R2.

As shown in FIG. 6B, extending member 322 may define an adjustment groove 342 for adjusting the position of extending member 322 in combination with rotation of adjustment lever 26. Adjustment groove 342 may extend partially or fully through a width of extending member 322. For example, as shown in FIG. 6B, adjustment groove 342 may be a recessed groove that faces a portion of adjustment lever 326. Adjustment lever 326 may include an adjustment protrusion 340 that protrudes into adjustment groove 342 defined in extending member 322. In at least one example, adjustment protrusion 340 may be positioned at a suitable location along adjustment lever 326 such that adjustment protrusion 340 remains within adjustment groove 342 as adjustment lever 326 is rotated in rotational direction R1 and rotational direction R2. For example, FIG. 6B shows adjustment protrusion 340 disposed at a position along adjustment lever 326 corresponding to the position of rotational-groove protrusion 364 illustrated in FIG. 6A such that adjustment protrusion 340 and rotational-groove protrusion 364 of adjustment lever 326 extend in opposite directions from a common portion of adjustment lever 326 (i.e., adjustment protrusion 340 may extend from a portion of adjustment lever 326 toward adjustment groove defined in extending member 322 and rotational-groove protrusion 364 may extend from the portion of adjustment lever 326 toward rotational groove 360 defined in head-mounted-display housing 316).

Adjustment groove 342 defined by extending member 322 may include a displacing section 344 that follows a displacing path. The displacing path along which adjustment groove 342 extends may not be congruent with a partial-circular path followed by adjustment protrusion 340 with respect to pivot 328 as adjustment lever 326 is rotated about pivot 328 in rotational direction R1 and rotational direction R2. For example, as shown in FIG. 6B, displacing section 344 may follow a linear or substantially linear path that is not parallel to extending direction X1 or contracting direction X2 shown in FIG. 5. Additionally or alternatively, at least a portion of displacing section 344 may follow a nonlinear path (e.g., an arcuate path) that is incongruent with the partial-circular path followed by adjustment protrusion 340 with respect to pivot 328. Accordingly, as adjustment protrusion 340 is rotated in rotational direction R1 or rotational direction R2, adjustment protrusion 340 may impinge on a portion of extending member 322 defining displacing section 344 so as to force extending member 322 in extending direction X1 or contracting direction X2. Thus, the rotational movement of adjustment lever 326 in rotational direction R1 or rotational direction R2 may be translated to linear movement of extending member 322 in extending direction X1 and contracting direction X2 as adjustment protrusion 340 moves along displacing section 344 of adjustment groove 342.

Adjustment groove 342 may also include a contracted holding section 346 adjacent to a first end of displacing section 344 and an extended holding section 348 adjacent to a second end of displacing section 344. As shown in FIG. 6B, extending member 322 may be disposed in the contracted holding position when adjustment protrusion 340 is disposed in contracted holding section 346. In some examples, spring 362 shown in FIG. 5 may bias extending member 322 in contracting direction X2 such that extending member 322 does not move out of the contracted holding position until a user moves adjustment lever 326 in rotational direction R1. Accordingly, adjustment protrusion 340 may be securely held within contracted holding section 346 so that extending member 322 is held in the contracted holding position shown in FIG. 6B when a force is applied to extending member 322 via a facial interface (e.g., facial interface 110 shown in FIGS. 3A and 3B) by the user's head when head-mounted-display system 100 (see FIG. 1) is secured to the user's head.

As shown in FIGS. 6C and 6D, adjustment lever 326 may be rotated by a user in rotational direction R1 to move extending member 22 from the contracted holding position shown in FIG. 6B. For example, as shown in FIG. 6C, rotational-groove protrusion 364 of adjustment lever 326 may move along rotational groove 360, which follows a partial-circular path, as adjustment lever 326 is rotated in rotational direction R1. As adjustment lever 326 is rotated in rotational direction R1, adjustment protrusion 340 may move along displacing section 344 of adjustment groove 342, which is not congruent with the partial-circular path followed by adjustment protrusion 340 with respect to pivot 328. Accordingly, adjustment protrusion 340 may apply a force to a portion of extending member 322 defining displacing section 344 of adjustment groove 342 in extending direction X1 such that extending member 322 is moved in extending direction X1 from the contracted holding position to an extended position as shown in FIG. 6D.

As shown in FIGS. 6E and 6F, adjustment lever 326 may be further rotated by the user in rotational direction R1 while maintaining or substantially maintaining extending member 322 in the extended position shown in FIG. 6D. For example, as shown in FIG. 6E, rotational-groove protrusion 364 of adjustment lever 326 may further move along rotational groove 360, which follows a partial-circular path as adjustment lever 326 is moved in rotational direction R1. As adjustment lever 26 is rotated in rotational direction R1, adjustment protrusion 340 may move along extended holding section 348 of adjustment groove 342 as shown in FIG. 6F. As illustrated in FIG. 6F, extended holding section 348 may be congruent or substantially congruent to a portion of a partial-circular path followed by adjustment protrusion 340 with respect to pivot 328. Accordingly, as lever end portion 332 of adjustment lever 326 is rotated back toward extending member 322, adjustment protrusion 340 may not move extending member 322 defining extended holding section 348 of adjustment groove 342 in contracting direction X2 shown in FIG. 5. Accordingly, the position of extending member 322 shown in FIG. 6D may be unchanged or substantially unchanged as adjustment protrusion 340 of adjustment lever 326 moves along extended holding section 348 of adjustment groove 342 as shown in FIG. 6F.

As illustrated in FIG. 6F, extending member 322 may be disposed in the extended holding position when adjustment protrusion 340 is disposed in extended holding section 348 of adjustment groove 342 (e.g., in an end portion of extended holding section 348 opposite displacing section 344). Extended holding section 348 of adjustment groove 342 may be shaped and oriented such that adjustment protrusion 340 is held within extended holding section 348 when extending member 322 is in the extended holding position illustrated in FIG. 6F. Extended holding section 348 of adjustment groove 342 may securely hold adjustment protrusion 340 when extending member 322 is in the extended holding position until adjustment protrusion 340 is rotated out of extended holding section 348 by a user via adjustment lever 326, thereby preventing extending member 322 from inadvertently moving out of the extended holding position. As such, extending member 322 and a facial interface (e.g., facial interface 110 illustrated in FIGS. 3A and 3B) coupled to extending member 22 may be held in the extended holding position shown in FIG. 6F when a force is applied to extending member 322 via the facial interface by a user's head when head-mounted-display system 100 (see FIG. 1) is secured to the user's head.

Figure 7:
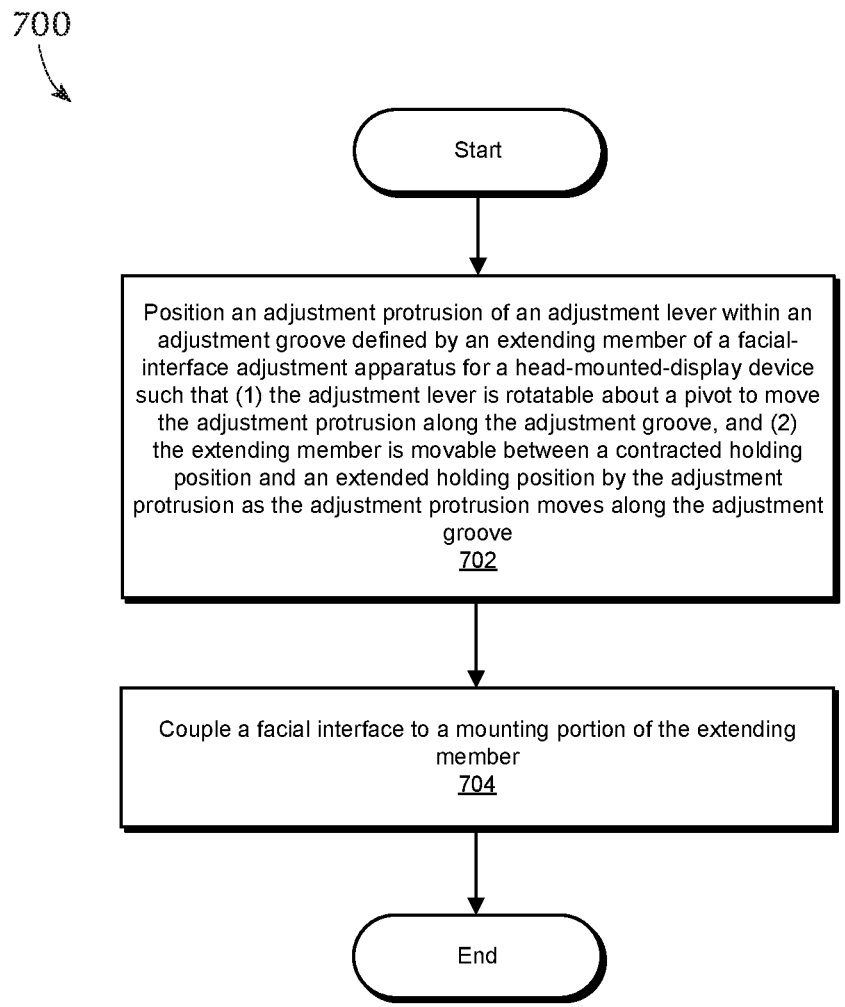
FIG. 7 is a block diagram of an exemplary method for assembling a facial-interface system for a head-mounted display in accordance with some embodiments.

FIG. 7 is a flow diagram of an exemplary method 700 for assembling a facial-interface system for a head-mounted display according to any of the embodiments disclosed herein. The steps shown in FIG. 7 may be performed by an individual and/or by any suitable manual and/or automated apparatus.

At step 702 in FIG. 7, an adjustment protrusion of an adjustment lever may be positioned within an adjustment groove defined in an extending member of a facial-interface adjustment apparatus for a head-mounted display such that (1) the adjustment lever is rotatable about a pivot to move the adjustment protrusion along the adjustment groove, and (2) the extending member is movable between a contracted holding position and an extended holding position by the adjustment protrusion as the adjustment protrusion moves along the adjustment groove.

For example, adjustment protrusion 140 of adjustment lever 126 may be positioned within adjustment groove 142 defined in extending member 122 of facial-interface adjustment apparatus 120 for head-mounted-display device 102 (see, e.g., FIGS. 1-3B; see also, FIGS. 4A-6F). In this example, adjustment lever 126 may be rotatable about pivot 128 to move adjustment protrusion 140 along adjustment groove 142 (see, e.g., FIGS. 2-3B; see also, FIGS. 4A-6F). Extending member 122 may be movable between a contracted holding position and an extended holding position by adjustment protrusion 140 as adjustment protrusion 140 moves along adjustment groove 142 (see, e.g., FIGS. 3A and 3B; see also, FIGS. 4A-6F).

At step 704 in FIG. 7, a facial interface may be coupled to a mounting portion of the extending member. For example, facial interface 110 may be coupled to mounting portion 124A and/or mounting portion 124B of extending member 122 (see, e.g., FIGS. 3A and 3B). In some embodiments, the facial-interface adjustment apparatus may be coupled to a head-mounted-display device. For example, facial-interface adjustment apparatus 120 may be coupled to head-mounted-display device 102 (see, e.g., FIGS. 1 and 2).

As discussed throughout the instant disclosure, the disclosed methods, systems, and devices may provide one or more advantages over traditional facial-interface systems. For example, the disclosed facial-interface systems may enable users to quickly and easily adjust facial interfaces. The facial-interface systems may include facial-interface adjustment apparatuses that enable users to adjust the positions of facial interfaces on corresponding head-mounted displays. The facial-interface adjustment apparatuses may each include an adjustment lever that is rotatable to move an extending member between a plurality of holding positions. Rotational movement of the adjustment lever may be translated to linear movement of the extending member. A facial interface may be coupled to the extending member so that the extending member adjusts the position of the facial interface with respect to a head-mounted-display housing. The facial-interface systems may thus enable users to position the facial interfaces so as to comfortably fit head-mounted displays to various user face sizes and shapes. The facial-interface systems may also enable users to wear accessories, such as glasses, while wearing the head-mounted displays. Accordingly, the facial-interface systems may allow users to adjust and comfortably wear head-mounted displays without having to replace the facial interfaces and/or interface cushions.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, to thereby enable others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A facial-interface system for a head-mounted display comprising:
 a facial interface; and
 a facial-interface adjustment apparatus comprising:
  an extending member comprising a mounting portion that is coupled to the facial interface, the extending member defining an adjustment groove; and
  an adjustment lever that comprises an adjustment protrusion that protrudes into the adjustment groove;
 wherein:
  the adjustment lever is rotatable about a pivot to move the adjustment protrusion along the adjustment groove; and
  the extending member is movable between a contracted holding position and an extended holding position by the adjustment protrusion as the adjustment protrusion moves along the adjustment groove.

2. The facial-interface system of claim 1, wherein:
the adjustment lever is rotatable about the pivot in a first rotational direction to move the extending member in an extending direction; and
the adjustment lever is rotatable about the pivot in a second rotational direction to move the extending member in a contracting direction opposite the extending direction.

3. The facial-interface system of claim 2, wherein:
the adjustment groove comprises a displacing section that follows a displacing path that is not congruent with a partial-circular path followed by the adjustment protrusion as the adjustment lever is rotated about the pivot; and
the extending member is forced between the contracted holding position and the extended holding position by the adjustment protrusion as the adjustment protrusion moves along the displacing section of the adjustment groove.

4. The facial-interface system of claim 3, wherein the adjustment groove further comprises a contracted holding section adjacent to a first end of the displacing section and an extended holding section adjacent to a second end of the displacing section.

5. The facial-interface system of claim 4, wherein:
the extending member is disposed in the contracted holding position when the adjustment protrusion is disposed in the contracted holding section of the adjustment groove; and
the extending member is disposed in the extended holding position when the adjustment protrusion is disposed in the extended holding section of the adjustment groove.

6. The facial-interface system of claim 4, wherein the extended holding section follows a holding path that is not parallel to the displacing path followed by the displacing section.

7. The facial-interface system of claim 4, wherein the extended holding section follows a holding path that is congruent with a portion of the partial-circular path followed by the adjustment protrusion as the adjustment lever is rotated about the pivot.

8. The facial-interface system of claim 2, wherein the facial-interface adjustment apparatus further comprises a spring that biases the extending member in the contracting direction.

9. The facial-interface system of claim 2, wherein an axis of rotation of the adjustment lever about the pivot extends in an axial direction that is substantially perpendicular to the extending direction and the contracting direction.

10. The facial-interface system of claim 1, wherein the facial-interface adjustment apparatus further comprises a support member that supports at least a portion of the extending member such that extending member moves relative to the support member as the extending member is forced between the contracted holding position and the extended holding position.

11. The facial-interface system of claim 10, wherein the support member is located between the facial interface and the pivot.

12. The facial-interface system of claim 10, wherein:
the adjustment lever extends through a lever channel defined in the support member; and
the adjustment lever moves along at least a portion of the lever channel as the adjustment lever is rotated about the pivot.

13. The facial-interface system of claim 1, wherein the adjustment protrusion protrudes in a direction that is substantially parallel to an axis of rotation of the adjustment lever about the pivot.

14. The facial-interface system of claim 1, wherein the facial interface is disposed at a separate location relative to the pivot when the adjustment protrusion of the adjustment lever is held at each of the contracted holding position and the extended holding position.

15. A head-mounted-display device comprising:
 a facial interface;
 a head-mounted-display housing; and
 a facial-interface adjustment apparatus coupled to the head-mounted-display housing, the facial-interface adjustment apparatus comprising:
  an extending member comprising a mounting portion that is coupled to the facial interface, the extending member defining an adjustment groove; and
  an adjustment lever that comprises an adjustment protrusion that protrudes into the adjustment groove;
 wherein:
  the adjustment lever is rotatable about a pivot to move the adjustment protrusion along the adjustment groove; and
  the extending member is forced between a contracted holding position and an extended holding position by the adjustment protrusion as the adjustment protrusion moves along the adjustment groove.

16. The head-mounted-display device of claim 15, wherein:
the adjustment lever is rotatable about the pivot in a first rotational direction to move the extending member in an extending direction; and
the adjustment lever is rotatable about the pivot in a second rotational direction to move the extending member in a contracting direction opposite the extending direction.

17. The head-mounted-display device of claim 15, wherein the extending member moves along an interior surface portion of the head-mounted-display housing when the extending member is forced between the contracted holding position and the extended holding position.

18. The head-mounted-display device of claim 15, wherein the facial interface is disposed at a separate location relative to the head-mounted-display housing when the adjustment protrusion of the adjustment lever is held at each of the contracted holding position and the extended holding position.

19. A method comprising:
positioning an adjustment protrusion of an adjustment lever within an adjustment groove defined by an extending member of a facial-interface adjustment apparatus for a head-mounted-display device such that:
the adjustment lever is rotatable about a pivot to move the adjustment protrusion along the adjustment groove; and
the extending member is movable between a contracted holding position and an extended holding position by the adjustment protrusion as the adjustment protrusion moves along the adjustment groove; and
coupling a facial interface to a mounting portion of the extending member.

20. The method of claim 19, further comprising coupling the facial-interface adjustment apparatus to a head-mounted-display device.

* * * * *